United States Patent [19]

Zink

[11] 4,332,937
[45] Jun. 1, 1982

[54] NAPHTHOLACTAM COMPOUNDS

[75] Inventor: Rudolf Zink, Therwil, Switzerland

[73] Assignee: Ciba-Geigy Corporation, Ardsley, N.Y.

[21] Appl. No.: 133,161

[22] Filed: Mar. 24, 1980

[30] Foreign Application Priority Data

Apr. 4, 1979 [CH] Switzerland ............... 3133/79

[51] Int. Cl.³ ..................................... C07D 413/02
[52] U.S. Cl. ................................. 544/105; 544/51
[58] Field of Search .......................... 544/51, 105

[56] References Cited

U.S. PATENT DOCUMENTS 3,673,182  7/1972  Brack ........................ 544/105 X
4,000,141 12/1976  Kuehlthau .................... 8/1 D X
4,185,151  1/1980  Kuehlthau .................... 546/167

OTHER PUBLICATIONS

Kuehlthau III, Chem. Abst. vol. 87, abst. 119254x (1977).
Venkataraman, The Chemistry of Synthetic Dyes, vol. II, p. 791, Academic Press Inc. NY (1952).

*Primary Examiner*—Richard Raymond
*Attorney, Agent, or Firm*—Edward McC. Roberts

[57] ABSTRACT

Novel blue naphtholactam compounds of the formula

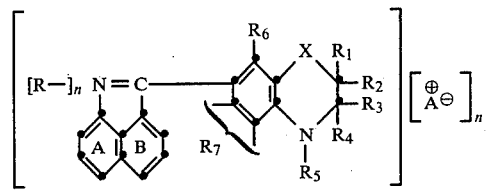

and their carbinol bases are described, in which formula R is hydrogen or a substituted or unsubstituted alkyl radical ($C_1$–$C_4$), X is a —O— or —S— atom, $R_1$, $R_2$, $R_3$ and $R_4$ independently of one another are hydrogen or a substituted or unsubstituted alkyl group having 1 to 6 carbon atoms, or one or two of these substituents $R_1$ to $R_4$ is or are a substituted or unsubstituted aryl group; $R_5$ is a substituted or unsubstituted $C_1$–$C_4$-alkyl group or a $C_2$–$C_4$ alkenyl group; and $R_6$ and $R_7$ independently of one another are hydrogen, halogen or an alkyl or alkoxy group, each having 1 to 4 carbon atoms, and the rings A and/or B can also be mono- or poly-substituted, A is an anion and n is 0 or 1.

Naphtholactam compounds in which n is 0 are suitable as dyes for transfer printing and those compounds in which n is 1 are used as dyes for dyeing and/or printing polyacrylonitrile materials or acid-modified polyamide or polyester materials.

15 Claims, No Drawings

NAPHTHOLACTAM COMPOUNDS

The invention relates to novel naphtholactam compounds of a basic or cationic nature and to their carbinol bases, processes for their preparation and their use as dyes for dyeing and/or printing textile material, in particular polyacrylonitrile materials or acid-modified polyamide and polyester materials.

The novel naphtholactam compounds have the formula I

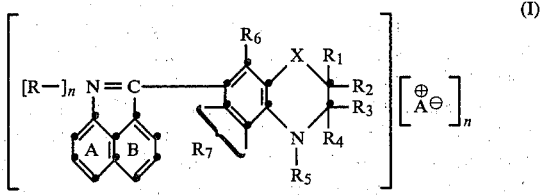

in which R is hydrogen or a substituted or unsubstituted alkyl radical ($C_1$–$C_4$), X is a —O— or —S— atom, preferably a —O— atom, $R_1$, $R_2$, $R_3$ and $R_4$ independently of one another are hydrogen or a substituted or unsubstituted alkyl group having 1 to 6 carbon atoms, or one or two of these substituents $R_1$ to $R_4$ is or are a substituted or unsubstituted aryl group; $R_5$ is a substituted or unsubstituted $C_1$–$C_4$-alkyl group or a $C_2$–$C_4$ alkenyl group; $R_6$ and $R_7$ independently of one another are hydrogen, halogen or an alkyl or alkoxy group, each having 1 to 4 carbon atoms, A is an anion and n is 0 or preferably 1 and the rings A and/or B can be unsubstituted or mono- or poly-substituted.

An alkyl radical ($C_1$–$C_4$) R is, for example: an unbranched or branched alkyl radical, such as the methyl, ethyl, n- or iso-propyl or n-, sec.- or tert.-butyl radical. These alkyl radicals can be substituted, for example by hydroxyl, alkoxy ($C_1$–$C_4$), phenoxy, alkoxy ($C_1$–$C_4$)-carbonyl, cyano, halogen, such as fluorine, chlorine or bromine, phenyl or phenyl substituted by nitro, halogen, alkyl or alkoxy. In preferred naphtholactam compounds, R is an unsubstituted alkyl radical ($C_1$–$C_4$), for example $CH_3$ or $C_2H_5$, or a substituted alkyl radical ($C_1$–$C_4$), for example cyanoethyl or methoxyethyl.

The rings A and/or B can be mono- or poly-substituted, for example by: alkyl groups ($C_1$–$C_4$; unbranched and branched), alkoxy groups ($C_1$–$C_4$), halogen, such as fluorine, chlorine or bromine; nitro, alkyl ($C_1$–$C_4$)-mercapto, alkyl ($C_1$–$C_4$)-sulfonyl, such as $CH_3SO_2$ or $C_2H_5SO_2$, arylsulfonyl, acylamino, such as alkyl ($C_1$–$C_4$)-carbonylamino, for example acetylamino, cyano, $CONH_2$, carboxamide which is N-monosubstituted or N,N-disubstituted (for example by alkyl), $SO_2NH_2$, sulfonamide which is N-monosubstituted or N,N-disubstituted (for example by alkyl), such as N,N-dibutylsulfonamide, and also carboxylic acid alkyl ester groups, such as a carboxylic acid methyl ester group or carboxylic acid ethyl ester group.

In preferred naphtholactam compounds, the rings A and/or B are either not substituted or are mono- or poly-substituted by halogen, CN, COOY, $CONH_2$, CONHY, $CON(Y)_2$, $SO_2NH_2$, $SO_2NHY$, $SO_2N(Y)_2$ or $SO_2Y$, in which Y is alkyl ($C_1$–$C_4$). The preferred substituent, however, is halogen, in particular bromine, which is located in ring A.

As a substituted or unsubstituted alkyl group having 1 to 6 carbon atoms, $R_1$, $R_2$, $R_3$ and/or $R_4$ are, for example, unsubstituted, unbranched or branched alkyl groups, for example the methyl, ethyl, n- or iso-propyl, n-, sec.- or tert.-butyl, n- or iso-pentyl or n- or isohexyl group or alkyl groups of this type which are substituted, for example by OH, CN and/or phenyl.

If one or two of these substituents $R_1$ to $R_4$ is or are a substituted or unsubstituted aryl group, these groups can be, for example: an unsubstituted phenyl group or an unsubstituted α- or β-naphthyl group or a phenyl or naphthyl group substituted, for example, by halogen, such as fluorine, chlorine or bromine, or by alkyl ($C_1$–$C_4$) or alkoxy ($C_1$–$C_4$).

In preferred naphtholactam compounds of the formula I, $R_1$, $R_2$ and $R_3$ are each hydrogen and $R_4$ is either hydrogen or the $CH_3$, $C_2H_5$ or $C_6H_5$ group.

As a substituted or unsubstituted alkyl group having 1 to 4 carbon atoms, $R_5$ is, for example, an unsubstituted, unbranched or branched alkyl group, such as the methyl, ethyl, n- or iso-propyl or n- or iso-butyl group, or an alkyl group of this type which is substituted, for example by OH, CN, alkoxy ($C_1$–$C_4$) or phenyl; an alkenyl group $R_5$ is, for example, the —$CH_2$—CH=$CH_2$ group.

In preferred naphtholactam compounds of the formula (I), $R_5$ is an alkyl group having 1 to 4 carbon atoms which is unsubstituted or substituted by OH, alkoxy ($C_1$–$C_4$), CN or phenyl, and in particular is $CH_3$, $C_2H_5$, $C_2H_4OH$, $C_2H_4OCH_3$, $C_2H_4OC_2H_5$ or $CH_2C_6H_5$.

Halogen $R_6$ and/or $R_7$ is, for example: fluorine, chlorine or bromine; as an alkyl or alkoxy group, each having 1 to 4 carbon atoms, $R_6$ and/or $R_7$ are: unbranched or branched alkyl and alkoxy groups, such as the methyl, ethyl, n- or iso-propyl or n- or iso-butyl group and the methoxy, ethoxy, iso-propoxy or butoxy group.

In preferred naphtholactam compounds, $R_6$ is hydrogen and $R_7$ is hydrogen or an alkyl group having 1 to 4 carbon atoms.

An anion "A" is either an organic or an inorganic ion, for example a halide, such as chloride, bromide or iodide, thiocyanate, sulfate, methylsulfate, ethylsulfate, aminosulfate, perchlorate, carbonate, bicarbonate, phosphate, molybdophosphate, tungstophosphate, toluenesulfonate, tungstomolybdophosphate, benzenesulfonate, naphthalenesulfonate, 4-chlorobenzenesulfonate, oxalate, maleate, formate, acetate, propionate, lactate, succinate, chloroacetate, tartrate, methanesulfonate or benzoate ion, or a complex anion, such as that of zinc chloride double salts.

If the naphtholactam compounds of the formula I are in the form of the carbinol bases, these are compounds of the formula

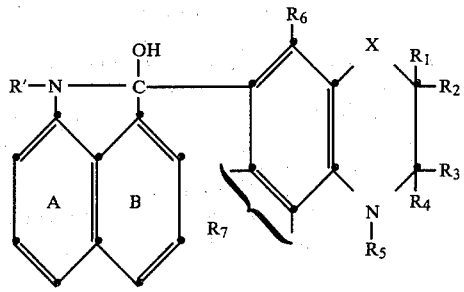

in which R' is a substituted or unsubstituted alkyl radical ($C_1$–$C_4$) and the other symbols are as defined under formula I.

Naphtholactam compounds which are of particular interest because of their especially brilliant shade, good colour strength and fastness to light are basic (n=0) and in particular cationic compounds of the formula I in which n is the number 1, R is the $CH_3$, $C_2H_4CN$, $C_2H_4OCH_3$, $C_2H_4OC_2H_5$ or $C_2H_5$ group, X is a —O— atom, $R_1$, $R_2$ and $R_3$ are each hydrogen, $R_4$ is hydrogen or the $CH_3$, $C_2H_5$ or $C_6H_5$ group, $R_5$ is the $CH_3$, $C_2H_5$,

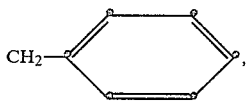

$C_2H_4OCH_3$, $C_2H_4OC_2H_5$, $C_2H_4CN$ or $C_2H_4OH$ group, $R_6$ is hydrogen, $R_7$ is hydrogen or alkyl ($C_1$–$C_4$) and the rings A and/or B either are not substituted or are substituted by bromine.

The naphtholactam compounds, according to the invention, of the formula I are prepared, for example, by reacting a naphtholactam compound of the formula II

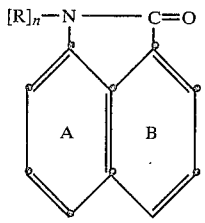

with a benzomorpholine or benzothiomorpholine compound of the formula III

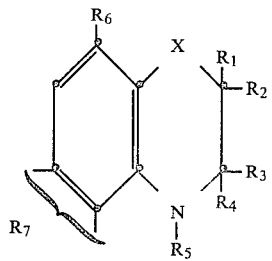

in the presence of a condensing agent, with the proviso that if any of the symbols in the formula I is a hydroxyl group this substituent must be in the form of an acyloxy group in the starting compounds of the formulae II and III and be converted to the hydroxyl group by hydrolysis only after the condensation reaction.

Suitable condensing agents are, for example, the following reagents which split off water: phosphoric acid halides, such as phosphorus oxytrichloride, phosphorus oxytribromide and phosphorus pentachloride, and also sulfuryl chloride, thionyl chloride, phosgene, zinc chloride, aluminium chloride and the like. It is also possible to use mixtures of these compounds, for example a mixture of phosphorus oxytrichloride and phosphorus pentoxide.

The condensation reaction is carried out with warming, in general at 50° to 150° C. and in particular at between 75° and 85° C. Solvents are not required, but, if desired, the reaction mixture can be diluted with an inert organic solvent, for example a chlorinated hydrocarbon, such as dichloroethane, tetrachloroethane or chlorobenzene.

If the starting compounds of the formulae II and/or III contain hydroxyl groups, these are converted to acyloxy groups by acylation, for example by means of acetic anhydride at a temperature of about 70° to 85° C., prior to the condensation reaction and after the condensation reaction are then saponified again in a known manner.

The naphtholactam compounds of the formula II are known (German Offenlegungsschrift No. 2,724,701) and can be prepared by known methods. Examples are: 1,8-naphtholactam, 4-bromo-1,8-naphtholactam, N-methyl-1,8-naphtholactam, N-methyl-4-bromo-1,8-naphtholactam, N-ethyl-4-bromo-1,8-naphtholactam, N-$\beta$-cyanoethyl-1,8-naphtholactam, N-$\beta$-methoxyethyl-1,8-naphtholactam, N-$\beta$-ethoxyethyl-1,8-naphtholactam, N-ethyl-2,4-dibromo-1,8-naphtholactam, N-ethyl-5-ethoxycarbonyl-1,8-naphtholactam, N-methyl-5-cyano-1,8-naphtholactam, N-ethyl-4-methylsulfonyl-1,8-naphtholactam, N-methyl-4-dibutylaminosulfonyl-1,8-naphtholactam, N-ethyl-1,8-naphtholactam, N-methyl-5-methoxycarbonyl-1,8-naphtholactam, N-methyl-4-methylsulfonyl-1,8-naphtholactam and N-ethyl-4-dibutylaminosulfonyl-1,8-naphtholactam.

Preferred positions for the substituents in the rings A and/or B are the 2-, 4- and 5-position.

The benzomorpholine compounds III are also known (for example from Chem. Berichten 30, page 1634 et seq. or 55, page 3821, or from the Chem. Zentralblatt 1898/II, page 525 and U.S. Patent Specification 2,448,869) and can likewise be prepared in a known manner. Examples taken from the large selection of such compounds are: 3-methyl-N-(2'-hydroxyethyl)-benzomorpholine, 3,6-dimethyl-N-(2'-hydroxyethyl)-benzomorpholine, 3-methyl-6-chloro-N-(2'-hydroxyethyl)-benzomorpholine, 3-phenyl-N-(2'-hydroxyethyl)-benzomorpholine, N-(2'-hydroxyethyl)-benzomorpholine, 3-methyl-N-(2'-hydroxypropyl)-benzomorpholine, 3-phenyl-6-methyl-N-(2'-hydroxyethyl)-benzomorpholine, 3,6-dimethyl-N-(2'-hydroxybutyl)-benzomorpholine, 3-methyl-N-(2-methoxyethyl)-benzomorpholine, 3-methyl-N-(2-ethoxyethyl)-benzomorpholine, N-methoxyethyl-benzomorpholine, N-ethyl-N-methyl-benzomorpholine, N-methyl-benzomorpholine, 3,6-dimethyl-N-methyl-benzomorpholine, 3-phenyl-N-methyl-benzomorpholine, 3-phenyl-6-methyl-N-methyl-benzomorpholine, 3-methyl-N-ethyl-benzomorpholine, 3,6-dimethyl-N-ethyl-benzomorpholine, 3-methyl-N-benzyl-benzomorpholine, 3-methyl-N-$\beta$-cyanoethyl-benzomorpholine and 3-methyl-N-methyl-benzomorpholine.

Both in the form of the basic and cationic compounds and in the form of the carbinol bases, the naphtholactam compounds, according to the invention, of the formula I are suitable as dyes for dyeing and, with the addition of binders and solvents, for printing very diverse synthetic fibres, for example polyvinyl chloride, polyamide and polyurethane fibres, fibres of polyesters of aromatic dicarboxylic acids, for example polyethylene glycol terephthalate fibres, and also, in particular, acid-modified polyester and polyamide fibres, but especially polymers of acrylonitrile and copolymers of acrylonitrile and asymmetrical dicyanoethylene or vinyl acetate. They are also suitable for spin-dyeing and for dyeing the said materials in the hydrated state, i.e. at a suitable point between the spinning jet and the drier (gel dyeing).

Naphtholactam compounds of the formula I in which n is 0 are suitable as dyes for transfer printing.

The said materials are preferably dyed from an aqueous, neutral or acid medium by the exhaustion method, if desired under pressure or by the continuous process. The textile material can be in very diverse forms, for example in the form of fibres, filaments, woven fabrics, knitted fabrics, piece goods and finished goods, such as shirts and pullovers.

On these materials, the novel dyes give brilliant, deep blue dyeings which are distinguished, in particular, by high fastness to light and a good appearance of shade in artificial light. In addition, they have good fastness to washing, to perspiration, to sublimation, to decatising, to rubbing, to carbonising, to water, to seawater, to chlorinated water, to cross-dyeing and to solvents and have good stability in a relatively wide pH range. A further advantage is that the naphtholactam dyes of the formula I can be combined well with other cationic dyes.

The novel dyes are also suitable for dyeing mixtures of the abovementioned materials with wool, the wool in the mixture being hardly affected by the dye. Furthermore, they can be used for dyeing and printing paper and mordanted cotton and for the preparation of inks and oil paints.

In the following examples parts (P) and percentages are by weight and the temperatures are in degrees centigrade.

EXAMPLE 1

8 P of 3-methyl-N-(2'-hydroxyethyl)-benzomorpholine are acylated in 4.9 P of acetic anhydride for 1 hour at 75°–80°. At 40°, 9.7 P of N-methyl-4-bromo-1,8-naphtholactam and 0.6 P of dry zinc chloride are added and 12.5 P of phosphorus oxytrichloride are added dropwise in the course of 10 minutes. The condensation reaction is carried out for 3 hours at 80°–85°, 40 P of methyl ethyl ketone and 47 P of water are added and the reaction mixture is saponified for 1 hour at 80°. The reaction mixture is neutralised with sodium hydroxide solution at 20°–25° and the product of the formula

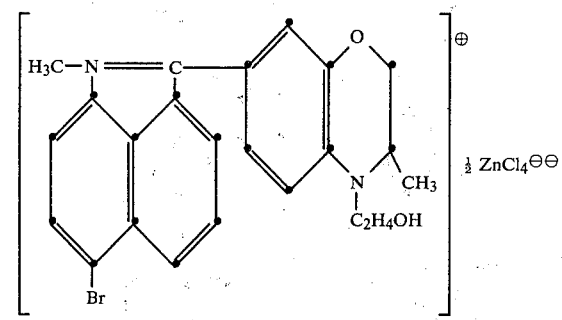

is precipitated at pH 5–6 by adding zinc chloride and sodium chloride. This yields 7 P of a readily soluble dye salt which dyes polyacrylonitrile fibres in a sky blue shade with outstanding fastness properties.

Valuable dyes are also obtained when the reaction is carried out analogously to the above example but using equivalent amounts of the naphtholactam and benzomorpholine compounds listed in Table I.

TABLE I

| No. | Naphtholactam compound | Benzomorpholine compound | Shade on polyacrylonitrile |
|---|---|---|---|
| 2 | $H_3C-N-C=O$ (naphtholactam) | benzomorpholine with $CH_3$, $C_2H_4OH$ | blue |
| 3 | $H_5C_2-N-C=O$ (naphtholactam) | benzomorpholine with $H_3C$, $CH_3$, $C_2H_4OH$ | blue |
| 4 | $H_3C-N-C=O$ (naphtholactam with Br) | benzomorpholine with Cl, $CH_3$, $C_2H_4OH$ | blue |
| 5 | $NCH_4C_2-N-C=O$ (naphtholactam) | benzomorpholine with phenyl, $C_2H_4OH$ | blue |

TABLE I-continued

| No. | Naphtholactam compound | Benzomorpholine compound | Shade on polyacrylonitrile |
|---|---|---|---|
| 6 | H₅C₂—N—C=O, Br, Br (naphtholactam) | benzomorpholine with N—C₂H₄OH | blue |
| 7 | H₅C₂—N—C=O, COOC₂H₅ | benzomorpholine with CH₃, CH₂CHCH₃, OH | blue |
| 8 | H₃C—N—C=O, CN | benzomorpholine with H₃C—, phenyl, C₂H₄OH | blue |
| 9 | H₅C₂—N—C=O, SO₂CH₃ | benzomorpholine with CH₃, C₂H₄OH | blue |
| 10 | H₃C—N—C=O, SO₂N(C₄H₉)₂ | benzomorpholine with H₃C—, CH₃, CH₂CH(OH)C₂H₅ | blue |
| 11 | H₃C—N—C=O | benzomorpholine with H₃C—, CH₃, C₂H₄OH | blue |
| 12 | H₃C—N—C=O | benzomorpholine with phenyl, C₂H₄OH | blue |
| 13 | H₃C—N—C=O | benzomorpholine with CH₃, CH₂CHCH₃, OH | blue |
| 14 | H₃C—N—C=O | benzomorpholine with H₃C—, CH₃, CH₂CH(OH)C₂H₅ | blue |

TABLE I-continued

| No. | Naphtholactam compound | Benzomorpholine compound | Shade on polyacrylonitrile |
|---|---|---|---|
| 15 | $H_5C_2-N-C=O$ (naphtholactam) | benzomorpholine with N-$C_2H_4OH$, $CH_3$ | blue |
| 16 | $H_5C_2-N-C=O$ (naphtholactam) | benzomorpholine with N-$C_2H_4OH$, phenyl | blue |
| 17 | $H_5C_2-N-C=O$ (naphtholactam) | benzomorpholine with $CH_3$, N-$CH_2CHCH_3$-$OH$ | blue |
| 18 | $H_5C_2-N-C=O$ (naphtholactam) | benzomorpholine with $H_3C$-, $CH_3$, $CH_2CH(OH)C_2H_5$ | blue |
| 19 | $H_3C-N-C=O$ (naphtholactam, Br) | benzomorpholine with $H_3C$-, $CH_3$, $C_2H_4OH$ | blue |
| 20 | $H_3C-N-C=O$ (naphtholactam, Br) | benzomorpholine with phenyl, $C_2H_4OH$ | blue |
| 21 | $H_3C-N-C=O$ (naphtholactam, Br) | benzomorpholine with $CH_3$, $CH_2CHCH_3$-$OH$ | blue |
| 22 | $H_3C-N-C=O$ (naphtholactam, Br) | benzomorpholine with $H_3C$-, $CH_3$, $CH_2CH(OH)C_2H_5$ | blue |
| 23 | $CH_3OH_4C_2-N-C=O$ (naphtholactam) | benzomorpholine with $C_2H_4OH$ | blue |

EXAMPLE 24

6.5 P of 3-methyl-N-methyl-benzomorpholine are dissolved in 25 P of dichloroethane, and 7.5 P of N-ethyl-1,8-naphtholactam, 5 P of phosphorus oxytrichloride and 2 P of phosphorus pentoxide are added and the reaction mixture is subjected to a condensation reaction for 4 hours at 75°–80°. 500 P of water are added at 50° and the dichloroethane is separated off. The aqueous phase is purified by extraction with ethyl acetate and, after filtering to give a clear filtrate, the dye salt is precipitated by adding zinc chloride and sodium chloride. After drying, this yields 12 P of the dye salt of the formula

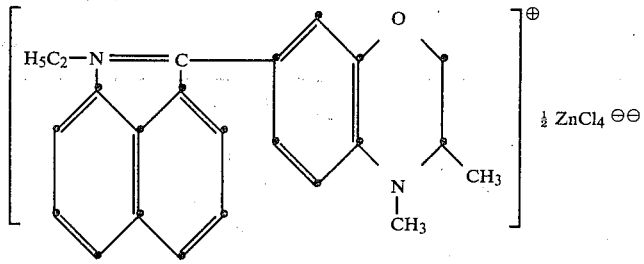

which dyes polyacrylonitrile fibres in blue shades with very good fastness properties.

Valuable dyes are likewise obtained when an analogous procedure is employed and the starting materials are correspondingly changed in accordance with Table II.

TABLE II

| No. | Naphtholactam compound | Benzomorpholine compound | Shade on polyacrylonitrile |
|---|---|---|---|
| 25 | H₃C—N—C=O (naphtholactam) | benzomorpholine, N-CH₃ | blue |
| 26 | H₃C—N—C=O (naphtholactam) | benzomorpholine, N-CH₃, CH₃ | blue |
| 27 | H₃C—N—C=O (naphtholactam) | benzomorpholine, H₃C, N-CH₃, CH₃ | blue |
| 28 | H₃C—N—C=O (naphtholactam) | benzomorpholine with phenyl, N-CH₃ | blue |
| 29 | H₃C—N—C=O (naphtholactam) | benzomorpholine, H₃C, with phenyl, N-CH₃ | blue |
| 30 | H₃C—N—C=O (naphtholactam) | benzomorpholine, CH₃, N-C₂H₅ | blue |
| 31 | H₃C—N—C=O (naphtholactam) | benzomorpholine, H₃C, CH₃, N-C₂H₅ | blue |

TABLE II-continued

| No. | Naphtholactam compound | Benzomorpholine compound | Shade on polyacrylonitrile |
|---|---|---|---|
| 32 | H₃C—N—C=O (naphtholactam) | benzomorpholine with CH₃, N-CH₂-phenyl | blue |
| 33 | H₅C₂—N—C=O (naphtholactam) | benzomorpholine, N-CH₃ | blue |
| 34 | H₅C₂—N—C=O (naphtholactam) | benzomorpholine with H₃C, CH₃, N-CH₃ | blue |
| 35 | H₅C₂—N—C=O (naphtholactam) | benzomorpholine with phenyl, N-CH₃ | blue |
| 36 | H₅C₂—N—C=O (naphtholactam) | benzomorpholine with H₃C, phenyl, N-CH₃ | blue |
| 37 | H₅C₂—N—C=O (naphtholactam) | benzomorpholine with CH₃, N-C₂H₅ | blue |
| 38 | H₅C₂—N—C=O (naphtholactam) | benzomorpholine with H₃C, CH₃, N-C₂H₅ | blue |
| 39 | H₅C₂—N—C=O (naphtholactam) | benzomorpholine with CH₃, N-CH₂-phenyl | blue |
| 40 | H₃C—N—C=O (naphtholactam with Br) | benzomorpholine, N-CH₃ | blue |

TABLE II-continued

| No. | Naphtholactam compound | Benzomorpholine compound | Shade on polyacrylonitrile |
|---|---|---|---|
| 41 | 8-Br-N-methylnaphtholactam | 3,4-dimethyl-benzomorpholine | blue |
| 42 | 8-Br-N-methylnaphtholactam | 3,4,6-trimethyl-benzomorpholine | blue |
| 43 | 8-Br-N-methylnaphtholactam | 4-methyl-3-phenyl-benzomorpholine | blue |
| 44 | 8-Br-N-methylnaphtholactam | 4,6-dimethyl-3-phenyl-benzomorpholine | blue |
| 45 | 8-Br-N-methylnaphtholactam | 4-ethyl-3-methyl-benzomorpholine | blue |
| 46 | 8-Br-N-methylnaphtholactam | 4-ethyl-3,6-dimethyl-benzomorpholine | blue |
| 47 | 8-Br-N-methylnaphtholactam | 4-benzyl-3-methyl-benzomorpholine | blue |
| 48 | 5-CN-N-methylnaphtholactam | 3,4,6-trimethyl-benzomorpholine | blue |
| 49 | 5-COOCH$_3$-N-methylnaphtholactam | 4-(2-cyanoethyl)-3-methyl-benzomorpholine | blue |

TABLE II-continued

| No. | Naphtholactam compound | Benzomorpholine compound | Shade on polyacrylonitrile |
|---|---|---|---|
| 50 | NCH4C2—N—C=O (naphtholactam) | benzomorpholine with N—CH3, phenyl | blue |
| 51 | H3C—N—C=O (naphtholactam with SO2CH3) | benzomorpholine with H3C, CH3, N—C2H5 | blue |
| 52 | H5C2—N—C=O (naphtholactam with SO2N(C4H9)2) | benzomorpholine with CH3, N—CH2-phenyl | blue |
| 53 | H3COH4C2—N—C=O (naphtholactam) | benzomorpholine with N—C2H5 | blue |
| 54 | H3C—N—C=O (naphtholactam) | benzomorpholine with CH3, N—C2H4OCH3 | blue |
| 55 | NCH4C2—N—C=O (naphtholactam) | benzomorpholine with CH3, N—C2H5 | blue |
| 56 | NCH4C2—N—C=O (naphtholactam) | benzomorpholine with N—C2H5 | blue |
| 57 | NCH4C2—N—C=O (naphtholactam) | benzomorpholine with N—CH2CH=CH2 | blue |
| 58 | H5C2—N—C=O (naphtholactam) | benzomorpholine with N—C2H4OCH3 | blue |
| 59 | NCH4C2—N—C=O (naphtholactam) | benzomorpholine with N—CH2-phenyl | blue |

TABLE II-continued

| No. | Naphtholactam compound | Benzomorpholine compound | Shade on polyacrylonitrile |
|---|---|---|---|
| 60 | NCH₄C₂—N—C=O (N-H, naphthalene fused) | benzomorpholine with CH₃ (on benzene), N—C₂H₅ | blue |
| 61 | NCH₄C₂—N—C=O (N-H, naphthalene fused) | benzomorpholine with CH₃ (on ring C), N—C₂H₅ | blue |
| 62 | H₃COH₄C₂—N—C=O (naphthalene fused) | benzomorpholine with CH₃ (on benzene), CH₃ (ring C), N—CH₃ | blue |
| 63 | H₅C₂OH₄C₂—N—C=O (naphthalene fused) | benzomorpholine with CH₃ (ring C), N—C₂H₅ | blue |
| 64 | H₅C₂—N—C=O (naphthalene fused) | benzomorpholine with N—C₂H₄OC₂H₅ | blue |

EXAMPLE 65

9.7 P of 3-methyl-N-(2′-hydroxyethyl)benzomorpholine are acylated in 6 P of acetic anhydride at 75°–80° for 1 hour. 8.9 P of N-ethyl-1,8-naphtholactam and 0.7 P of dry zinc chloride are added at 40°. 14 P of phosphorus oxytrichloride are also added dropwise in the course of 5 minutes and the reaction mixture is warmed to 75°–80° and kept at this temperature for 2½ hours, and 50 P of water are then added dropwise at 60°. The reaction mixture is heated to 70°–75° and kept at this temperature for ½ hour, during which time the acetyl group is saponified. 150 P of n-butanol are now added and the pH is adjusted to 12 with sodium hydroxide solution. The brown butanol phase is separated off and mixed with 200 P of water and the pH is adjusted to 2 with concentrated hydrochloric acid. The butanol is distilled off in a rotary evaporator and the residual aqueous solution is filtered to give a clear filtrate and sodium hydroxide solution is added at 40° until the carbinol base of the formula

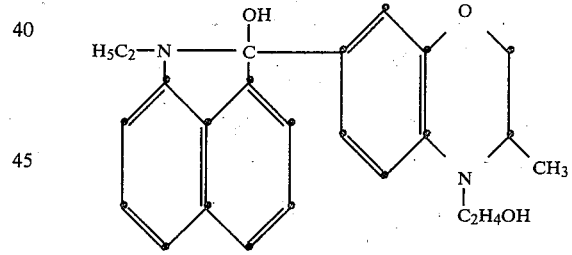

precipitates completely; this base is filtered off and dried. This base is readily soluble in, for example, dilute acetic acid and dyes polyacrylonitrile fibres in reddish-tinged blue shades with very good fastness properties.

When the naphtholactam and benzomorpholine compounds listed in Table I and II are used, a method analogous to that described above yields the corresponding dyes in the form of the carbinol bases, which have similar properties.

EXAMPLE 66

4.1 P of 3-methyl-N-methyl-benzomorpholine are dissolved in 12.5 P of dichloroethane, and 4.2 P of 1,8-naphtholactam, 3 P of phosphorus pentoxide and 10 P of phosphorus oxytrichloride are added successively and the mixture is warmed to 80°. The condensation reaction is carried out for 1 hour at 81°–83°, the reaction mixture is cooled to 25°, 100 P of water are added slowly dropwise and the pH is adjusted to about 9 with an aqueous solution of sodium hydroxide. The reaction mixture is extracted with 200 P of ethyl acetate and the solvent is distilled off. After protonising with acetic acid, 7.5 P of the dye of the formula

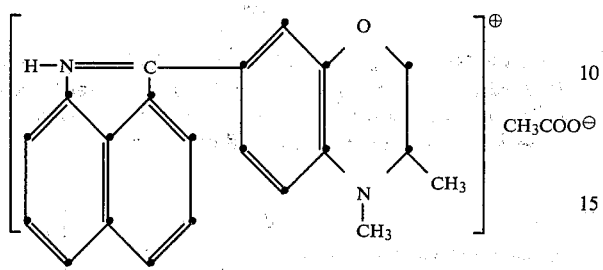

are thus obtained and this dye can be used in the conventional manner to dye polyacrylonitrile fibres. A reddish-tinged blue dyeing with very good general fastness properties is obtained.

When the same procedure is repeated using the benzomorpholine compounds listed in Table II in place of 3-methyl-N-methyl-benzomorpholine and using 1,8-naphtholactam or 4-bromo-1,8-naphtholactam as the naphtholactam compound, further dyes according to the invention are obtained which are used specifically for transfer printing on polyacrylonitrile by the following method:

3.75 g of the dye obtained according to Example 66 are dissolved, with the addition of 2 g of sodium methylate, in an amount of a mixture of 10 g of ethylene glycol, 86 g of ethyl alcohol and 4 g of ethylcellulose such that the volume of the finished ink is 100 ml. If a paper impregnated with this ink is pressed for 30–60 seconds at about 200° with a textile material made of polyacrylonitrile, a very deep, brilliant blue print with very good fastness to light, wet fastness properties and fastness to rubbing is obtained.

The addition of sodium methylate to the printing ink can also be dispensed with.

EXAMPLES 67 AND 68

Dyes which are equally valuable for transfer printing are obtained by a procedure analogous to that described in Example 66 when the starting materials are correspondingly changed in accordance with Table III:

TABLE III

| No. | Naphtholactam compound | Benzomorpholine compound | Shade on polyacrylonitrile |
|---|---|---|---|
| 67 | HN—C=O (naphthalene) | (benzomorpholine with C₂H₄OCH₃) | blue |
| 68 | HN—C=O (naphthalene) | (benzomorpholine with CH₃, C₂H₅) | blue |

EXAMPLE 69

5 g of the dye prepared according to Example 1 are mixed to a paste with 2 g of 40% acetic acid and dissolved, by adding 4,000 g of hot water. 1 g of sodium acetate and 2 g of an adduct obtained from 15 to 20 equivalents of ethylene oxide and N-octadecyldiethylenetriamine and quaternised with dimethyl sulfate are also added and 100 g of polyacrylonitrile fabric are put into the liquor at 60°. The bath is heated to 100° in the course of 30 minutes and dyeing is then carried out at the boil for 90 minutes. The liquor is then allowed to cool to 60° in the course of 30 minutes. The material dyed in this way is then removed and subsequently rinsed with lukewarm and cold water. A sky blue polyacrylonitrile dyeing is obtained which has good fastness to light.

EXAMPLE 70

A polyacrylonitrile copolymer, consisting of 93% of acrylonitrile and 7% of vinyl acetate, is dissolved in dimethylacetamide to give a 15% solution. The spinning liquid is extruded in a spinning bath which consists of 40% of dimethylacetamide and 60% of water. The resulting tow is then stretched by known methods and freed from dimethylacetamide by rinsing with hot and cold water.

This wet tow is dyed by immersing in a bath which is at 42° and contains 9 g/l of the dye according to Example 1 and the pH value of which has been adjusted to 4.5 with acetic acid.

The contact time between the two and the dye liquor is 2 seconds. The excess dye liquor is then squeezed off and the tow is fed to the drier. A blue coloured tow with good fastness properties results.

EXAMPLE 71

A printing paste is prepared which consists of: 25 P of the dye obtained according to Example 1, 30 P of thiodiglycol, 20 P of acetic acid (80%), 350 P of boiling water, 500 P of carob bean thickener, 30 P of 1:1 tartaric acid, 15 P of di-(β-cyanoethyl)-formamide and 30 P of a naphthalenesulfonic acid/formaldehyde condensation product.

A polyacrylonitrile fabric printed with this printing paste is then fixed for 20 to 30 minutes at 101° to 103° on a high temperature festoon ager and finished in the conventional manner. A blue print is obtained.

What is claimed is:

1. A naphtholactam compound of the formula I

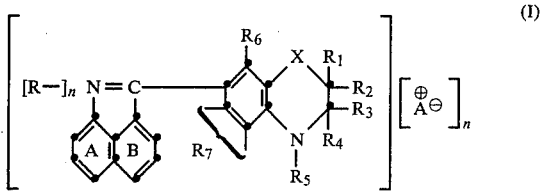

or the carbinol base thereof, in which R is hydrogen or $C_1$–$C_4$ alkyl which is unsubstituted or substituted by CN or $C_1$–$C_4$ alkoxy; X is a —O— atom; $R_1$, $R_2$ and $R_3$ are hydrogen; $R_4$ is hydrogen, $C_1$–$C_6$ alkyl which is unsubstituted or substituted by OH, CN or phenyl, or is phenyl; $R_5$ is a $C_1$–$C_4$ alkyl group which is unsubstituted or substituted by OH, CN, $C_1$–$C_4$ alkoxy or phenyl, or is $C_2$–$C_4$ alkenyl; $R_6$ and $R_7$, each independently of the other, is hydrogen, $C_1$–$C_4$ alkyl or halogen; A is an anion; n is 0 or 1; and rings A and B are unsubstituted or substituted by halogen, CN, COOY, $CONH_2$, CONHY, $CON(Y)_2$, $SO_2NH_2$, $SO_2NHY$, $SO_2N(Y)_2$ or $SO_2Y$ in which Y is $C_1$–$C_4$ alkyl.

2. A naphtholactam compound of the formula I according to claim 1, wherein n is the number 1.

3. A naphtholactam compound according to claim 1, wherein R is a substituted or unsubstituted alkyl radical ($C_1$–$C_4$).

4. A naphtholactam compound according to claim 3, wherein R is $CH_3$, $C_2H_5$, $CNC_2H_4$ or $CH_3OC_2H_4$.

5. A naphtholactam compound according to claim 1, wherein $R_4$ is hydrogen or the $CH_3$, $C_2H_5$ or $C_6H_5$ group.

6. A naphtholactam compound according to claim 1, wherein $R_5$ is an unsubstituted alkyl group having 1 to 4 carbon atoms or is an alkyl group having 1 to 4 carbon atoms which is substituted by OH, CN, alkoxy ($C_1$–$C_4$) or phenyl.

7. A naphtholactam compound according to claim 8, wherein $R_5$ is the $CH_3$, $C_2H_5$, $C_2H_4OH$, $C_2H_4OCH_3$, $C_2H_4OC_2H_5$ or $CH_2$—$C_6H_5$ group.

8. A naphtholactam compound according to claim 1, wherein $R_6$ is hydrogen and $R_7$ is hydrogen or an alkyl group having 1 to 4 carbon atoms.

9. A naphtholactam compound according to claim 1, wherein the rings A and/or B are not substituted or are mono- or poly-substituted by halogen, in particular bromine.

10. A naphtholactam compound according to claim 1, wherein R is an unsubstituted alkyl radical ($C_1$–$C_4$) and $R_5$ is alkoxyethyl, in which the alkoxy group has 1-4 C atoms.

11. A naphtholactam compound according to claim 1, wherein R is cyanoethyl or alkoxyethyl, in which the alkoxy group has 1-4 C atoms, and $R_5$ is alkyl($C_1$–$C_4$).

12. An naphtholactam compound according to either of claims 10 or 11, wherein $R_1$, $R_2$ and $R_3$ are hydrogen and $R_4$ is hydrogen or methyl.

13. A naphtholactam compound according to claim 1, wherein R is the $CH_3$, $C_2H_4CN$, $C_2H_4OCH_3$, $C_2H_4OC_2H_5$ or $C_2H_5$ group, $R_4$ is hydrogen or a $CH_3$, $C_2H_5$, or $C_6H_5$ group, $R_5$ is a $CH_3$, $C_2H_5$,

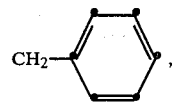

$C_2H_4OCH_3$, $C_2H_4OC_2H_5$, $C_2H_4CN$ or $C_2H_4OH$ group, $R_6$ is hydrogen or $C_1$–$C_4$ alkyl and the rings A and/or B either are not substituted or are substituted by bromine.

14. A naptholactam compound of the formula

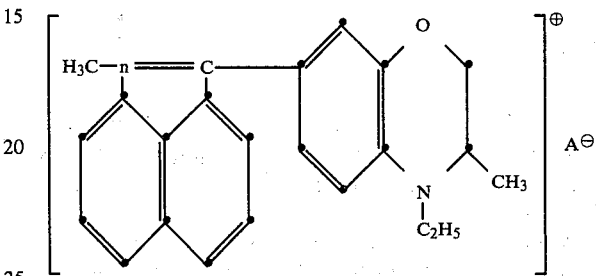

in which $A^\ominus$ is an anion.

15. A naphtholactam compound of the formula

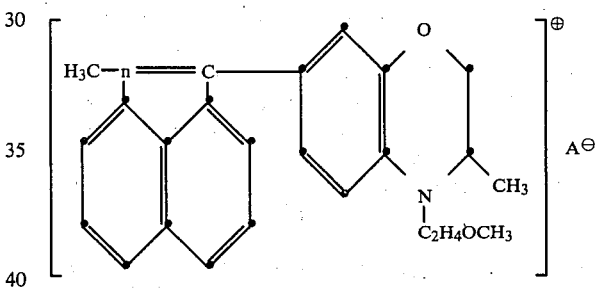

in which $A^\ominus$ is an anion.

* * * * *

UNITED STATES PATENT AND TRADEMARK OFFICE
CERTIFICATE OF CORRECTION

PATENT NO. : 4,332,937
DATED : June 1, 1982
INVENTOR(S) : RUDOLF ZINK

It is certified that error appears in the above—identified patent and that said Letters Patent is hereby corrected as shown below:

Claim 14 & 15, column 24 line 17 & 32, extreme left side of the chemical structure, "$H_3C-n=$"

Should read: -- $H_3C-N=$ --

Signed and Sealed this

Tenth Day of August 1982

[SEAL]

Attest:

Attesting Officer

GERALD J. MOSSINGHOFF
Commissioner of Patents and Trademarks